*(12)* United States Patent
Gao

*(10)* Patent No.: US 8,644,141 B2
*(45)* Date of Patent: Feb. 4, 2014

(54) METHOD AND SYSTEM FOR OPTIMIZING NETWORK COVERAGE AND CAPACITY

(75) Inventor: Yin Gao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 174 days.

(21) Appl. No.: 13/266,167

(22) PCT Filed: Dec. 22, 2009

(86) PCT No.: PCT/CN2009/075856
§ 371 (c)(1),
(2), (4) Date: Oct. 25, 2011

(87) PCT Pub. No.: WO2010/124501
PCT Pub. Date: Nov. 4, 2010

(65) Prior Publication Data
US 2012/0039166 A1     Feb. 16, 2012

(30) Foreign Application Priority Data

Apr. 27, 2009  (CN) .......................... 2009 1 0135586

(51) Int. Cl.
*H04J 1/16*     (2006.01)
(52) U.S. Cl.
USPC .......................................... 370/229; 370/252
(58) Field of Classification Search
USPC ......... 370/221, 252, 254, 310, 329, 328, 330, 370/331, 332, 333; 455/423, 450, 426.1
See application file for complete search history.

(56) References Cited

U.S. PATENT DOCUMENTS

| | | | |
|---|---|---|---|
| 6,456,652 B1* | 9/2002 | Kim et al. ...................... | 375/224 |
| 2009/0023587 A1 | 1/2009 | Huynh et al. | |
| 2010/0284303 A1* | 11/2010 | Catovic et al. ................ | 370/254 |
| 2011/0195707 A1* | 8/2011 | Faerber et al. ................ | 455/423 |
| 2012/0139790 A1* | 6/2012 | Wirola et al. ................. | 342/385 |
| 2012/0208539 A1* | 8/2012 | Alonso-Rubio et al. ...... | 455/436 |

FOREIGN PATENT DOCUMENTS

| | | |
|---|---|---|
| CN | 1237869 A | 12/1999 |
| CN | 1295388 A | 5/2001 |
| CN | 101208966 A | 6/2008 |

OTHER PUBLICATIONS

International Search Report for PCT/CN2009/075856 dated Mar. 15, 2010.

* cited by examiner

*Primary Examiner* — Abdullah Riyami
(74) *Attorney, Agent, or Firm* — Ling Wu; Stephen Yang; Ling and Yang Intellectual Property

(57) ABSTRACT

A method and system for optimizing network coverage and capacity are provided. The method comprises that: judging whether there is a problem of coverage and capacity according to the threshold set in a NodeB for the collected coverage and capacity optimizing data; if yes, the NodeB provides a solution strategy according to the problem of coverage and capacity as well as the coverage and capacity optimizing data causing the problem. The method achieves the automation of network coverage and capacity, saves a great deal of manpower and material resource needed by the traditional optimizing method, and decreases the cost of network operation and maintenance.

11 Claims, 2 Drawing Sheets

METHOD AND SYSTEM FOR OPTIMIZING NETWORK COVERAGE AND CAPACITY

TECHNICAL FIELD

The present invention relates to mobile communication systems, and more especially, to a method and system for optimizing network coverage and capacity.

BACKGROUND OF THE RELATED ART

A Long Term Evolution (LTE) system consists of an Evolved UMTS Terrestrial Radio Access Network (E-UTRAN) and a Packet Core (EPC) network, wherein, the E-UTRAN consists of a set of Evolved NodeBs (eNB) connecting with the EPC via the S1 interface, while the eNBs can connect with each other via X2, the interfaces S1 and X2 are logic interfaces. One EPC can manage one or more eNBs, one eNB can be controlled by a plurality of EPCs, one eNB can manage one or more cells. The LTE-Advanced (LTE-A) system is evolved from the LTE system, and its network architecture is consistent with that of the LTE system, and some technologies such as relay, coordinated multipoint transmission reception (CoMP) are applied in the LTE-A system to enhance the system performance.

The establishment and operation of a network needs to do a lot of work, such as planning, configuration, optimization, calculation, adjustment, testing, error prevention, decreasing the breakdown and self-healing, etc., operators want to reduce operating costs and maintenance costs, while users need to simplify the process of operation, for example, users hope that a Home NodeB equipment is a Plug and Play device so that they can immediately use it after buying it and taking back to home, and the device can be configured automatically after powering on. Especially, for the LTE system, its development trend must be self-configuring, self-optimizing and self-adaptive and the impact on the network due to human factors will be minimized.

In network operation, the operators hope to provide continuous, uplink and downlink matched and optimized network coverage, optimized uplink and downlink system capacity, and optimal coverage and capacity balancing, while reduce interference in the network to improve the cell-edge performance. Currently, the network coverage manually uses planning tool to plan the NodeB distribution and cell configuration at the initial stage of network planning, optimizes the network coverage and capacity during the network operation, still manually learn system status parameters through the network optimization tool, analyzes the system state parameters, determines problem in the system, and manually adjusts and solves the problem in the system. The manual optimization causes a huge waste of human resources, the network maintenance costs are high, and wrong configuration and missed configuration easily occur in the manual configuring.

SUMMARY OF THE INVENTION

In view of this, the main purpose of the present invention is to provide a method and system for optimizing network coverage and capacity to address the problem that manual optimization has high costs and is error-prone so as to achieve the auto-optimizing of network coverage and capacity.

The present invention provides a method for optimizing network coverage and capacity, and the method comprises:

A NodeB judges whether there is coverage and capacity problem based on the set threshold parameters for the collected data coverage and capacity optimizing data, and if yes, the NodeB determines the solution strategy according to the existing coverage and capacity problem and the coverage and capacity optimizing data causing the problem.

In the above scheme, the step of the NodeB judging whether there is coverage and capacity problem based on the set threshold parameters for the collected data coverage and capacity optimizing data is specifically: setting a threshold for cell signal quality and a threshold for the number of cell switching failures in the NodeB, once the signal quality in the cell coverage and capacity optimizing data collected by the NodeB is lower than the set threshold and the number of the cell switching failures surpasses the set threshold, it is believed that there is the problem of loss of cell coverage;

And/or setting a threshold for the number of dropped calls in the NodeB, when the number of dropped calls in the cell coverage and capacity optimizing data collected by the NodeB surpasses the threshold, if it is determined that the cell adjacent to this cell has been deleted according to the cell deletion information of the adjacent NodeB, it is believed that there is the problem of loss of cell coverage.

In the above scheme, said determined solution strategy is specifically: the NodeB acquiring that the cell loses coverage due to the poor quality of wireless signals, and then increasing the cell pilot power and changing the antenna inclination;

The NodeB acquiring that the cell loses coverage due to the deletion of the adjacent cell, and then increasing the cell pilot power and changing the antenna inclination.

In the above scheme, the method further comprises:

If the NodeB can not determine the solution strategy or can not learn whether the determined solution strategy is performable, or the determined solution strategy needs to adjust the parameters of other peer NodeBs, the NodeB sends a coverage and capacity optimization judgment request to a network management node;

According to the coverage and capacity optimization judgment request, the network management node performs the optimization judgment, sending a coverage and capacity optimization command to the relevant NodeB.

In the abovementioned scheme, the method further comprises:

When the NodeB cannot determine the solution strategy, the optimizing data causing the coverage and capacity problem is sent to the network management node;

The network management node determines a solution strategy according to the received optimizing data causing the coverage and capacity problem and the local configuration data, and sends a coverage and capacity optimization command to the NodeB.

In the abovementioned scheme, the method further comprises:

When the NodeB cannot learn whether the determined solution strategy is performable, it requests the network management node to judge the performability of the solution strategy via the coverage and capacity optimization judgment request;

The network management node compares the solution strategy with the cell constraint relationship set by itself, if the above solution strategy is performable, it sends a coverage and capacity optimization command to the NodeB to inform the NodeB that the solution strategy is performable.

In the abovementioned scheme, the method further comprises:

When the solution strategy determined by the NodeB needs to adjust the parameters of other peer NodeBs, the NodeB requests the network management node to adjust the parameters of the other peer NodeBs via a coverage and capacity optimization judgment request;

According to the coverage and capacity optimization judgment request, the network management node locally checks whether the peer NodeBs can adjust the parameters, and if yes, it sends a coverage and capacity optimization command to the peer NodeBs.

The present invention provides a system for optimizing network coverage and capacity, and the system comprises a NodeB, and the NodeB comprises a coverage and capacity detection module and a coverage and capacity management module; wherein:

The coverage and capacity detection module is used to collect the coverage and capacity optimizing data, and according to the threshold set for the collected coverage and capacity optimizing data, determine whether there is a coverage and capacity problem; and if yes, notify the existing coverage and capacity problem to the coverage and capacity management module, and send the coverage and capacity optimizing data causing the coverage and capacity problem to the coverage and capacity management module;

The coverage and capacity management module is used to determine a solution strategy according to the existing coverage and capacity problem and the coverage and capacity optimizing data causing the problem.

In the abovementioned scheme, the system also comprises a network management node to perform optimization judgment and send a coverage and capacity optimization command to the relevant NodeBs;

The coverage and capacity management module is also used to send a coverage and capacity optimization request to the network management node when it can not determine the solution strategy or can not learn whether the determined solution strategy is performable, or the determined resolution strategy needs to adjust parameters of other peer NodeBs.

In the abovementioned scheme, the coverage and capacity management module is also used to send the optimizing data causing the coverage and capacity problem to said network management node when the solution strategy cannot be determined;

In the abovementioned scheme, the network management node is also used to determine a solution strategy according to the local configuration data and the received optimizing data causing the coverage and capacity problem, and to send a coverage and capacity optimizing command to the coverage and capacity management module.

In the abovementioned scheme, the coverage and capacity management module is also used to request the network management node to judge the performability of the solution strategy via a coverage and capacity optimization judgment request when it cannot learn whether the determined solution strategy is performable;

In the abovementioned scheme, the network management node is also used to compare the solution strategy with the cell constraint relationship set by the network management node itself, if the above solution strategy is performable, it sends a coverage and capacity optimization command to the coverage and capacity management module to inform the coverage and capacity management module that the solution strategy is performable.

In the abovementioned scheme, the coverage and capacity management module is also used to request the network management node to adjust the parameters of other peer NodeBs via the coverage and capacity optimization judgment request when the determined solution strategy needs to adjust the parameters of other peer NodeBs;

In the abovementioned scheme, the network management node is also used to locally check whether the peer NodeBs are able to adjust the parameters according to the coverage and capacity optimization judgment request, and if yes, it sends a coverage and capacity optimization command to the peer NodeBs.

In summary, the present invention fulfills the optimizing process via the NodeB, achieves the automatic coverage and capacity optimization, saves a great deal of manpower and material resource needed by the traditional optimizing method, and decreases the cost of network operation and maintenance, meanwhile, when the network is dynamically changing, the present invention can effectively make up for the phenomenon of wrong configuration and missed configuration of parameters in the network planning, effectively compensate and optimize the network coverage and capacity, improve the network performance, reduce the dropped call rate, and overall improve the customer satisfaction.

PREFERRED EMBODIMENTS OF THE PRESENT INVENTION

The basic idea of the present invention is: a NodeB collects the coverage and capacity optimizing data, and judges whether there is coverage and capacity problem based on the set threshold for the collected coverage and capacity optimizing data configured at the NodeB, and if yes, the NodeB determines the solution strategy according to the existing coverage and capacity problem and the coverage and capacity optimizing data causing the problem.

The specific embodiments of the present invention will be illustrated with combination of the accompanying figures.

Figure 1:
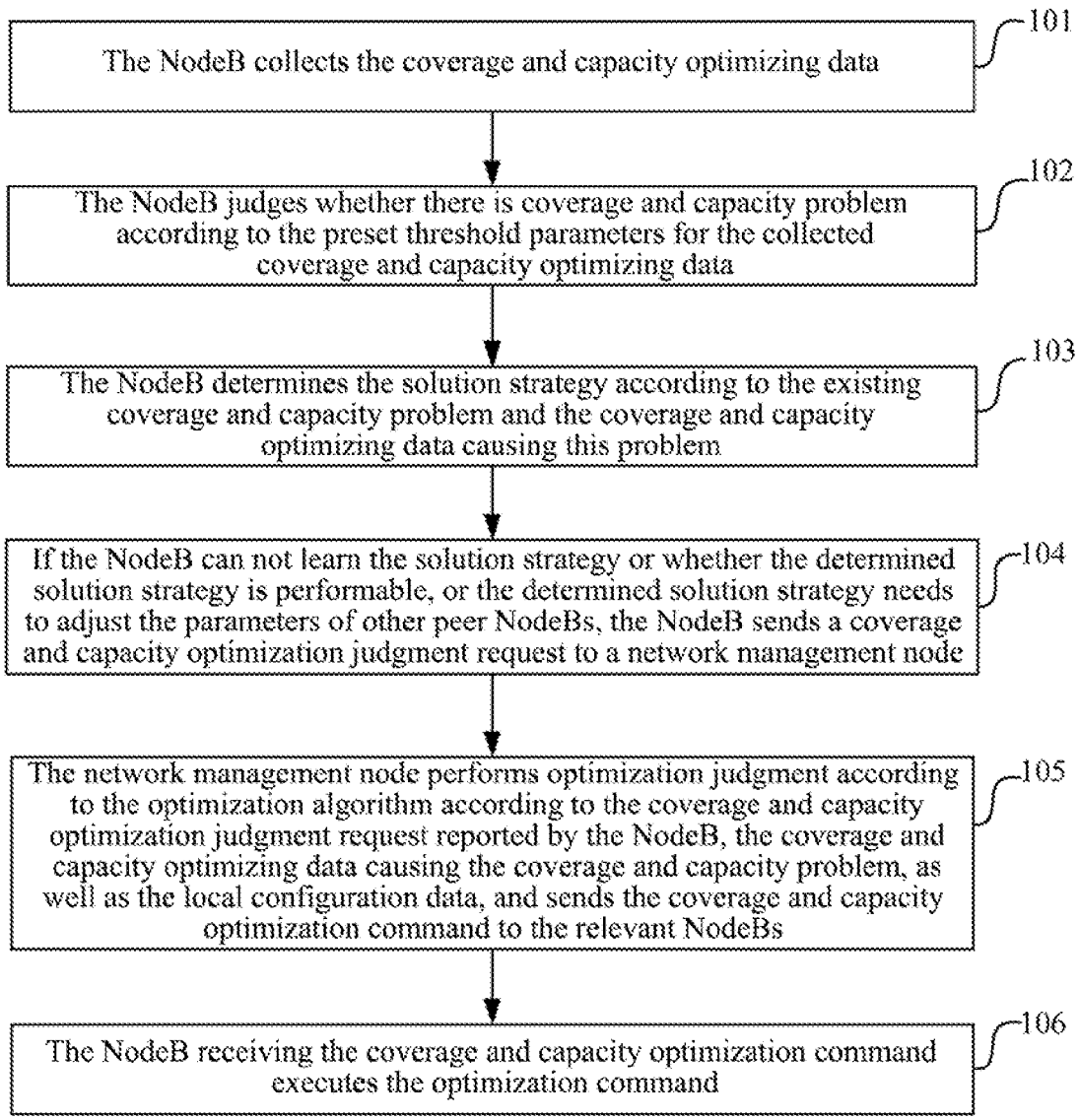
FIG. 1 illustrates the flow chart of the method for optimizing the network coverage and capacity in accordance with the present invention.

FIG. 1 illustrates the method for optimizing the network coverage and capacity in accordance with the present invention, and the method comprises the following steps:

Step 101: the NodeB collects the coverage and capacity optimizing data;

Said coverage and capacity optimizing data comprises: the cell signal quality measured by the terminal included in the terminal measurement report, which is about the cell in the local NodeB and the cell in other NodeBs; the inter-cell uplink and downlink interference indication and cell increasing and deleting information of the adjacent cell included in the inter-NodeB coverage and capacity relevant measurement report; the relevant coverage and capacity information of the NodeB, such as the cell switching performance counter information of the NodeB, including the number of cell switchings, the number of switching failures, and reasons of the switching failures; as well as the cell dropped call counter information of NodeB, such as the number of the cell dropped calls and the reasons of the dropped calls.

Step 102: the NodeB judges whether there is coverage and capacity problem according to the set threshold parameters for the collected coverage and capacity optimizing data;

Specifically, a threshold parameter for the collected coverage and capacity optimizing data is set in the NodeB, the NodeB compares the corresponding threshold parameter with the collected coverage and capacity optimizing data to determine whether there is a problem of coverage and capacity;

For example, a threshold for cell signal quality and a threshold for the number of cell switching failures are set in the NodeB, once the signal quality in the coverage and capacity optimizing data of the cell A collected by the NodeB is lower than the set threshold or the number of the cell A switching failures surpasses the set threshold, it is believed that there is the problem of loss of cell A coverage;

In another example, a threshold for the number of dropped calls is set in the NodeB, when the number of dropped calls in the cell B collected by the NodeB surpasses the set threshold, it determines that the cell adjacent to the cell B has been deleted according to the cell deletion information of the adjacent NodeB, and it is believed that there is the problem of loss of cell coverage.

Step 103: the NodeB determines the solution strategy according to the existing coverage and capacity problem and the coverage and capacity optimizing data causing this problem;

For example, the NodeB learns that the cell A loses coverage due to the poor wireless signal quality, and then increase the cell A pilot power and change the antenna inclination to make the cell A coverage complete.

For example, the NodeB learns that the cell B loses coverage due to the deletion of the adjacent cell, and then it increases the cell B pilot power and change the antenna inclination to make the cell B coverage complete.

Step 104: if the NodeB can not learn the solution strategy or whether the determined solution strategy is performable, or the determined solution strategy needs to adjust the parameters of other peer NodeBs, the NodeB sends a coverage and capacity optimization judgment request to a network management node;

For example, the local cell parameter adjustment is constrained so that the solution strategy is not performable, and when other peer NodeBs needs to adjust their parameters, the NodeB reports this information to the network management node.

For example, since the operators defines some constraint relationships during the network coverage planning, and for some remote areas, the discontinuous coverage is allowed, thus when some areas do not learn whether it needs to perform coverage compensation, the NodeB reports this information to the network management node.

Step 105: the network management node performs optimization judgment according to the optimization algorithm according to the coverage and capacity optimization judgment request reported by the NodeB, the coverage and capacity optimizing data causing the coverage and capacity problem, as well as the local configuration data, and sends the coverage and capacity optimization command to the relevant NodeBs;

The local configuration data of the network management node comprises: the basic information of the managed NodeB, adjacent relationship, and cell information. Wherein the basic information comprises the NodeB identifier and geographical position; the cell information comprises cell identifier, coverage range and adjacent cell list.

Said network management node can also set some cell constraint relationships as conditions of the coverage and capacity optimization judgment, such as the coverage black list including the areas not needing coverage optimization, and the areas can be indicated with geographic latitude and longitude.

There are a variety of optimization algorithms, comprising:

According to the request for the peer NodeBs of the NodeB (the problematic NodeB) which send the coverage and capacity optimization judgment request adjusting the parameters in the coverage and capacity optimization judgment request, and after locally checking whether the peer NodeBs can adjust their parameters, the network management node sends the coverage and capacity optimization command to the peer NodeBs;

According to the request for judging the performability of the solution strategy in the coverage and capacity optimization judgment request, the network management node compares the solution strategy with the cell constraint relationship set by the network management node itself, and if adjustable, it sends the coverage and capacity optimization command to the problematic NodeB to notify the problematic NodeB that the solution strategy is performable; and If the problematic NodeB cannot determine the solution strategy, the network management node determines a solution strategy according to the received optimizing data causing the coverage and capacity parameter and the local configuration data and sends the coverage and capacity optimization command to the problematic NodeB, for example, according to the number of cell switchings, the number of switching failures, the reasons of the switching failures as well as the local configuration data reported by the problematic NodeB, it determines that the cell A of the problematic NodeB has high switching failure rate since the cell B of NodeB 2 is missed configured as an adjacent cell, and then notifies the problematic NodeB to configure the cell B of the NodeB 2 as the adjacent cell of the cell A to perform coverage optimization adjustment.

Step 106: the NodeB receiving the coverage and capacity optimization command executes the optimization command;

the NodeB receiving the coverage and capacity optimization command executes the optimization command, such as modifying the adjacent cell configuration relationship list, adjusting the cell transmission power, adjusting the antenna inclination and adjusting the delay parameter related to the coverage and capacity.

When the configuration related to the coverage and capacity in the network management node changes, for example, the adjacent relationship list changes, the network management node can notifies the changed information to the NodeB via the coverage and optimization command, and the command from the network management node has the highest priority.

Figure 2:
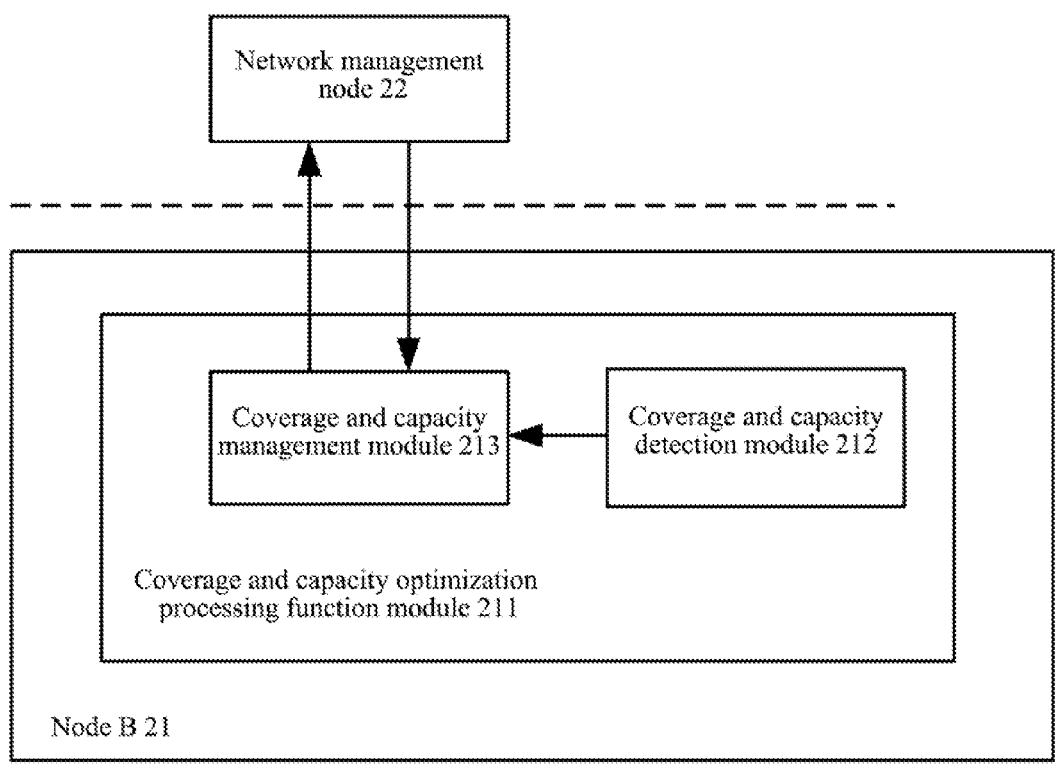
FIG. 2 illustrates the architecture of the system for optimizing the network coverage and capacity in accordance with the present invention.

FIG. 2 shows a system for optimizing network coverage and capacity in accordance with the present invention, and the system comprises: the NodeB 21 and the network management node 22, wherein, in the NodeB 21 there is provided the coverage and capacity optimization processing function module 211 which comprises the coverage and capacity detection module 212 and the coverage and capacity management module 213; wherein:

The coverage and capacity detection module 212 is used to collect the coverage and capacity optimizing data, and according to the threshold set for the collected coverage and capacity optimizing data, determine whether there is a coverage and capacity problem; and if yes, notify the existing coverage and capacity problem to the coverage and capacity management module 213 and send the coverage and capacity optimizing data causing the coverage and capacity problem to the coverage and capacity management module 213.

The coverage and capacity management module 213 is used to determine a solution strategy according to the existing coverage and capacity problem and the coverage and capacity optimizing data causing the problem; if it does not learn whether the solution strategy is performable, cannot determine a solution strategy or it needs to adjust the parameters of the other peer NodeBs, send the coverage and capacity optimization judgment request to the network management node 22, and also send the optimizing data causing the coverage and capacity problem to the network management node 22; it is also used to execute the optimization command after receiving the coverage and capacity optimization command.

The network management node 22 is used to perform optimization judgment according to the optimization algorithms based on the coverage and capacity optimization judgment request reported by the coverage and capacity management module 213, the coverage and capacity optimizing data causing the coverage and capacity problem, as well as the local configuration data and send the coverage and capacity optimization command to the relevant NodeBs;

There are a variety of optimization algorithms, comprising:

The network management node 22 locally checks that the peer NodeBs can adjust their parameters and then sends the coverage and capacity optimization command to the peer NodeBs according to the request for the peer NodeBs of the NodeB 21 adjusting the parameters in the coverage and capacity optimization judgment request;

The network management node 22 compares the solution strategy with the cell constraint relationship set the by network management node 22 itself according to the request for judging the performability of the solution strategy in the coverage and capacity optimization judgment request, and if adjustable, sends the coverage and capacity optimization command to the coverage and capacity management module 213 in the NodeB 21 to notify the NodeB 21 that the solution strategy is performable; and When the solution strategy cannot be determined, the network management node 22 determines a solution strategy according to the received optimizing data causing the coverage and capacity problem and the local configuration data, and sends a coverage and capacity optimization command to the coverage and capacity management module 213 in the NodeB 21, for example, determine that the cell A in the NodeB 21 has high switching failure rate since the cell B of NodeB X is missed configured as its adjacent cell according to the number of cell switchings, the number of switching failures and the reasons of the switching failures as well as the local configuration data reported by the coverage and capacity management module 213 in the NodeB 21, and then notify the NodeB 21 to configure the cell B in the NodeB X as the adjacent cell of the cell A to perform the coverage optimization adjustment.

In LTE and LTE-A systems, the network management node is the upper layer network management operation background of the NodeB.

Finally, it should be pointed out that the above embodiments are used to illustrate the present invention rather than to restrict the present invention. Without departing from the spirit and essence of the present invention, all types of modification or variations should fall into the scope of the claims of the present invention.

What is claimed is:

1. A method for optimizing network coverage and capacity, comprising:
    judging by a NodeB whether there is a coverage and capacity problem based on set threshold parameters for collected coverage and capacity optimizing data, and if yes, determining by the NodeB a solution strategy according to the existing coverage and capacity problem and the coverage and capacity optimizing data causing the problem;

wherein, the step of judging by a NodeB whether there is a coverage and capacity problem based on the set threshold parameters for the collected coverage and capacity optimizing data is at least one of the following:
    setting a threshold for cell signal quality and a threshold for a number of cell switching failures in the NodeB, once the signal quality in the coverage and capacity optimizing data of the cell collected by the NodeB is lower than the set threshold and the number of the cell switching failures surpasses the set threshold, it is believed that the cell has a coverage loss problem; and
    setting a threshold for the number of dropped calls in the NodeB, when the number of the dropped calls in the coverage and capacity optimizing data of the cell collected by the NodeB surpasses the threshold, it is determined that a cell adjacent to this cell has been deleted according to cell deletion information of a adjacent NodeB, and it is believed that the cell has the coverage loss problem.

2. The method of claim 1, wherein, the determined solution strategy is specifically: the NodeB learning that the cell has the coverage loss due to poor quality of wireless signals, and then increasing cell pilot power and changing antenna inclination;
    the NodeB learning that the cell has the coverage loss due to the deletion of the adjacent cell, and then increasing the cell pilot power and changing the antenna inclination.

3. The method of claim 1, further comprising:
    if the NodeB cannot determine the solution strategy or cannot learn whether the determined solution strategy is performable, or the determined solution strategy needs to adjust the parameters of other peer NodeBs, the NodeB sending a coverage and capacity optimization judgment request to a network management node;
    according to the coverage and capacity optimization judgment request, the network management node performing the optimization judgment, sending a coverage and capacity optimization command to relevant NodeBs.

4. The method of claim 3, further comprising:
    when the NodeB cannot determine the solution strategy, the NodeB sending the optimizing data causing the coverage and capacity problem to the network management node;
    the network management node determining a solution strategy according to received optimizing data causing the coverage and capacity problem and local configuration data, and sending the coverage and capacity optimization command to the NodeB.

5. The method of claim 3, further comprising:
    when the NodeB cannot learn whether the determined solution strategy is performable, the NodeB requesting the network management node to judge a performability of the solution strategy via the coverage and capacity optimization judgment request;
    the network management node comparing the solution strategy with cell constraint relationship set by the network management node itself, if the above solution strategy is performable, sending the coverage and capacity optimization command to the NodeB to inform the NodeB that the solution strategy is performable.

6. The method of claim 3, further comprising:
    when the solution strategy determined by the NodeB needs to adjust the parameters of other peer NodeBs, the NodeB requesting the network management node to adjust the parameters of the other peer NodeBs via the coverage and capacity optimization judgment request;

according to the coverage and capacity optimization judgment request, the network management node locally checking whether the peer NodeBs can adjust the parameters, and if yes, sending the coverage and capacity optimization command to the peer NodeBs.

7. A system for optimizing network coverage and capacity, comprising NodeBs, and the NodeB comprising a coverage and capacity detection module and a coverage and capacity management module; wherein:

the coverage and capacity detection module is used to collect coverage and capacity optimizing data, and according to set threshold parameters for the collected coverage and capacity optimizing data, determine whether there is a coverage and capacity problem; and if yes, notify the existing coverage and capacity problem to the coverage and capacity management module and send the coverage and capacity optimizing data causing the coverage and capacity problem to the coverage and capacity management module;

the coverage and capacity management module is used to determine a solution strategy according to the existing coverage and capacity problem and the coverage and capacity optimizing data causing the problem;

wherein, the coverage and capacity detection module is further used to determine whether there is a coverage and capacity problem in at least one of the following way:

setting a threshold for cell signal quality and a threshold for a number of cell switching failures in the NodeB, once the signal quality in the coverage and capacity optimizing data of the cell collected by the NodeB is lower than the set threshold and the number of the cell switching failures surpasses the set threshold, it is believed that the cell has a coverage loss problem; and setting a threshold for the number of dropped calls in the NodeB, when the number of the dropped calls in the coverage and capacity optimizing data of the cell collected by the NodeB surpasses the threshold, it is determined that a cell adjacent to this cell has been deleted according to cell deletion information of a adjacent NodeB, and it is believed that the cell has the coverage loss problem.

8. The system of claim 7, wherein, the system also comprises a network management node which is used to perform optimization judgment and send a coverage and capacity optimization command to the relevant NodeBs;

the coverage and capacity management module is also used to send a coverage and capacity optimization request to the network management node when the solution strategy cannot be determined, or whether the determined solution strategy is performable cannot be learned, or the determined solution strategy needs to adjust the parameters of other peer NodeBs.

9. The system of claim 8, wherein, the coverage and capacity management module is also used to send the optimizing data causing the coverage and capacity problem to said network management node when the solution strategy cannot be determined;

the network management node is also used to determine a solution strategy according to local configuration data and received optimizing data causing the coverage and capacity problem, and to send the coverage and capacity optimizing command to the coverage and capacity management module.

10. The system of claim 8, wherein, the coverage and capacity management module is also used to request the network management node to judge a performability of the solution strategy via the coverage and capacity optimization judgment request when whether the determined solution strategy is performable cannot be learned;

the network management node is also used to compare the solution strategy with a cell constraint relationship set by the network management node itself, if the above solution strategy is performable, to send the coverage and capacity optimization command to the coverage and capacity management module to inform the coverage and capacity management module that the solution strategy is performable.

11. The system of claim 8, wherein, the coverage and capacity management module is also used to request the network management node to adjust the parameters of other peer NodeBs via the coverage and capacity optimization judgment request when the determined solution strategy needs to adjust the parameters of other peer NodeBs; the network management node is also used to locally check whether the peer NodeBs can adjust the parameters according to the coverage and capacity optimization judgment request, and if yes, the network management node sends the coverage and capacity optimization command to the peer NodeBs.

* * * * *